United States Patent [19]

Fullilove et al.

[11] Patent Number: 4,685,692
[45] Date of Patent: Aug. 11, 1987

[54] FOOT PEDAL OR ARM CRANK DRIVEN RIDING BICYCLE

[75] Inventors: Tom P. Fullilove, P.O. Box 6063, Shreveport, La. 71106; Frank L. Dahlberg, Keithville, La.

[73] Assignee: Tom P. Fullilove, Shreveport, La.

[21] Appl. No.: 907,015

[22] Filed: Sep. 15, 1986

[51] Int. Cl.⁴ .................................................. B62M 1/00
[52] U.S. Cl. ...................................... 280/234; 280/249
[58] Field of Search ............... 280/230, 231, 232, 233, 280/334, 242 R, 249

[56] References Cited

U.S. PATENT DOCUMENTS

| | | | |
|---|---|---|---|
| 641,926 | 1/1900 | Bollinger | 280/234 |
| 646,161 | 3/1900 | Atkinson | 280/234 |
| 4,417,742 | 11/1983 | Intengan | 280/249 |

Primary Examiner—John J. Love
Assistant Examiner—Donn McGiehan
Attorney, Agent, or Firm—Scrivener and Clarke

[57] ABSTRACT

A riding bicycle normally driven over terrain by foot pedals operating on a sprocket shaft, is provided with hand cranks which operate through a flexible drive on the foot operated sprocket shaft, the flexible drive permitting full use of the steering fork throughout its range without impeding operation of the bicycle by the hand cranks.

2 Claims, 3 Drawing Figures

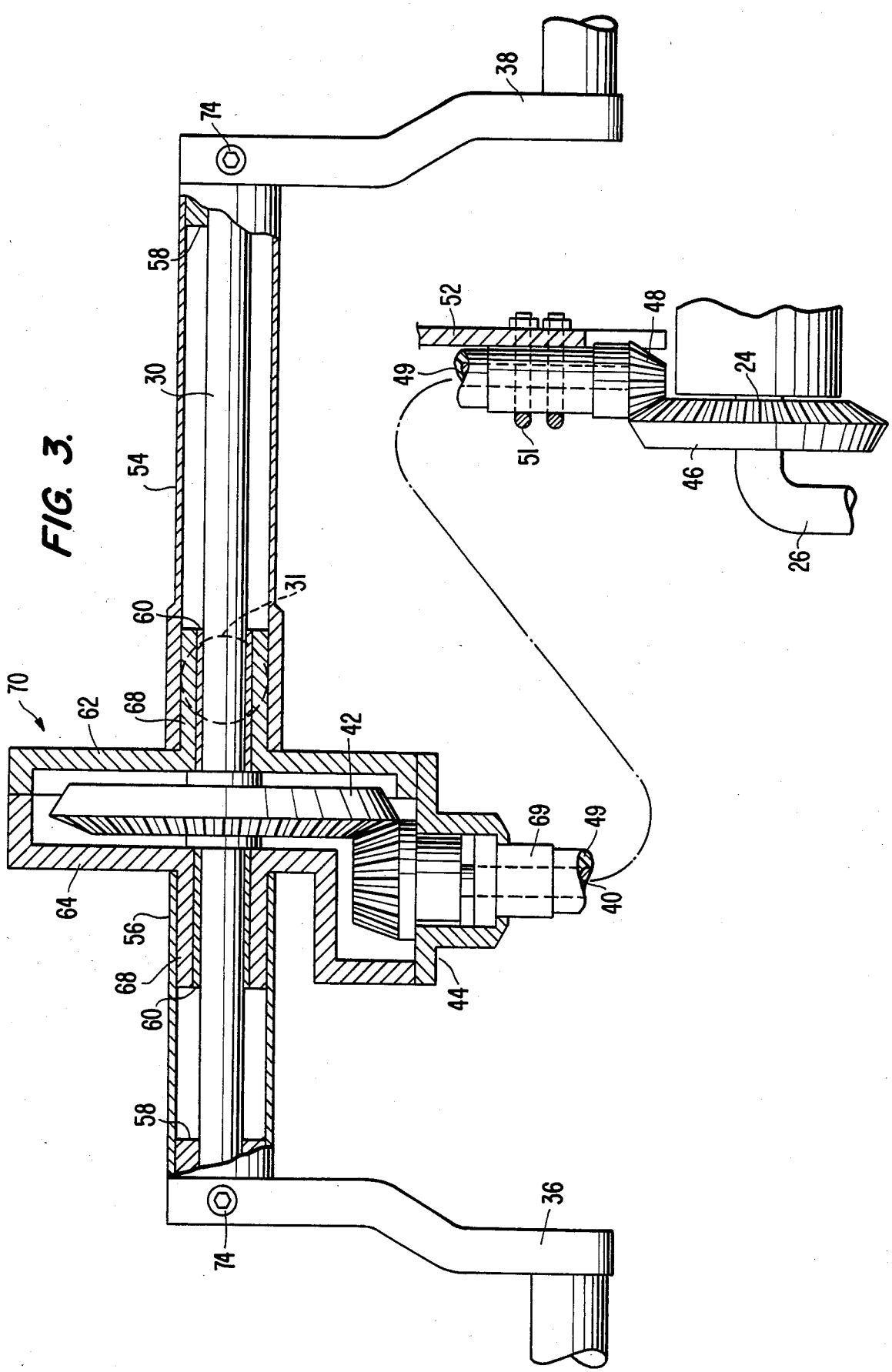

FOOT PEDAL OR ARM CRANK DRIVEN RIDING BICYCLE

This invention relates to riding bicycles, by which is meant a bicycle which a rider drives by foot action over terrain, and more particularly to a foot driven riding bicycle which includes hand cranks by which the bicycle may also be driven over terrain.

Stationary exercise bicycles wherein a wheel, or its equivalent, is driven by either foot pedals or hand cranks are known as shown, for example, in the patents to Zent U.S. Pat No. 3,991,749, Carnielli U.S. Pat No. 3,964,742, or Peters U.S. Pat No. 4,402,502. In the high wheel bicycles of the late 19th century it was known to drive the high front wheel by either foot pedals or hand cranks and the patent to Johnston U.S. Pat. No. 31,4335 is representative of such bicycles.

Hartley shows in his patent U.S. Pat. No. 484,712 a riding bicycle of more or less conventional construction in which the rear wheel is driven by a chain and foot pedal operated sprocket with the front wheel capable of being driven by a chain and hand crank operated sprocket, the hand cranks being also the handlebars carried by the steering fork.

In a non-geared bicycle as shown in the Hartley patent, the foot pedals and hand cranks always rotate at the same speed proportionate to the rotational speed of the wheels. In a geared bicycle having up to ten (10) different speeds, the foot pedals operate at a varying lesser rotational speed proportionate to the rear wheel depending on the gear selected. Thus with the geared bicycle, it can be seen that if the hand cranks were drivingly connected to the front wheel, at high gear the front wheel could be rotating so rapidly that the rider would have difficulty in holding on. Thus, in a multi-speed bicycle the hand cranks must be operably connected to the rear wheel through the foot pedal operated sprocket in order that, at high wheel speed, the hand cranks as well as the foot pedals rotate at the same relatively low speed proportionate to the high speed of the wheels.

So far as applicant is aware, no one has ever heretofore successfully provided a conventional riding bicycle with hand crank driving means which drives the bicycle through the rear wheel and, more particularly, transmits hand crank power to the rear wheels through the conventional pedal operated sprocket. Why this has not heretofore been successful is believed to be due to the problem of continuously transmitting hand power to the foot-operated sprocket shaft as the steering fork is moved angularly about its axis to steer the bicycle. The problem can be illustrated by references to the Carnielli patent directed to a stationary exercise bicycle where hand power is transmitted from the hand cranks to the foot pedal-operated sprocket shaft by means of bevel gears, a universal joint and a telescoping drive shaft. Though such an arrangement is satisfactory for a stationary bicycle having no rotatable steering fork, when such an arrangement is used on a conventional bicycle, for safety's sake, the drive train must be enclosed in a housing fixed to the frame which makes it almost impossible to steer the bicycle without the drive binding in the housing or the gears at one end or the other separating.

The broad object of the present invention is to provide an arrangement wherein a riding bicycle and particularly a mutli-speed bicycle, of substantially conventional construction can be driven through the rear wheel by either hand or foot power with the drive train between the hand cranks and rear wheel being unaffected by the angular position of the steering fork.

Another object of the invention is to provide a hand crank drive means for a multi-speed bicycle wherein the hand cranks operate on the same sprocket shaft as the foot pedals whereby both the hand cranks and foot pedals operate at the same proportionate speed relative to wheel speed regardless of the selected speed of operation.

More particularly it is an object of the invention to obtain the foregoing results by the use of a flexible cable which drivingly connects the hand cranks and the foot pedal operated sprocket shaft.

The foregoing and other objects will become apparent when the following detailed description is read in conjunction with the accompanying drawings wherein:

FIG. 3 is an enlarged broken view, partly in cross section, illustrating details of the present invention.

Figure 1:
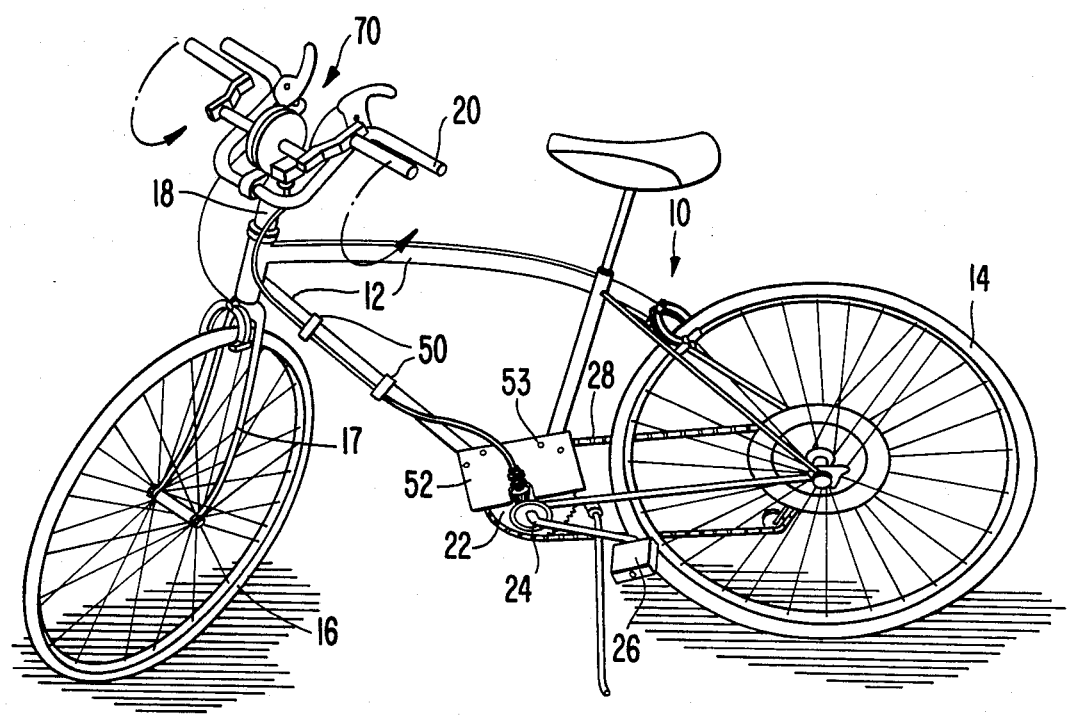
FIG. 1 is a perspective view of a conventional multi-speed bicycle incorporating the present invention.
Figure 2:
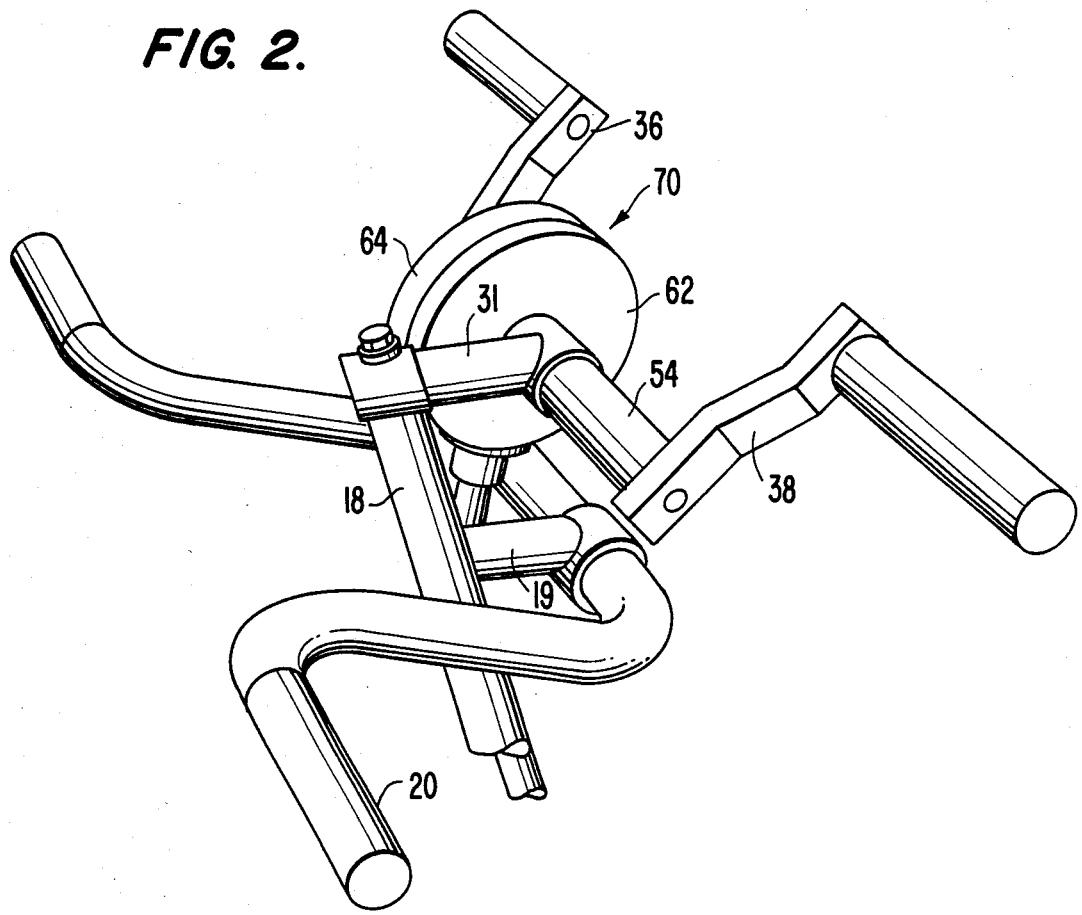
FIG. 2 is an enlarged broken perspective view showing features of the present invention.

Referring now to the drawings a riding bicycle of substantially conventional construction is broadly designated by the numeral 10. The bicycle 10 includes a frame 12 having a geared multi-speed rear driving wheel 14 and a front steering wheel 16 journaled on a steering fork 17 carrying at its upper end a handebar stem 18 including a connector 19 for handlebars 20. The frame carries a sprocket 22 mounted adjacent one end of a shaft 24 operated by foot pedals 26 and drivingly connected by a sprocket chain 28 to the rear wheel 14.

In accordance with the invention, means for driving the bicycle by hand are provided comprising a rotatable shaft 30 substantially parallel to the handlebars 20 shown as in FIG. 3, which is connected intermediate its ends by a second connector 31 to the stem 18 substantially parallel to the handlebars 20. Hand cranks 36, 38 are connected to each of the respective ends of the shaft 30 and a flexible drive shaft 40 extends between the rotatable shaft 30 and the sprocket shaft 24. First drive means connect one end of the flexible drive shaft to the rotatable shaft and comprises a first bevel gear 42 carried by the rotatable shaft 30 and a first bevel pinion 44 drivingly fixed to one end of the flexible shaft 40. Second drive means connect the opposite end of the flexible shaft to the sprocket shaft 24 on the side of the frame opposite the sprocket 22 and comprises a second bevel gear 46 co-axially fixed to the sprocket shaft 24 and a second bevel pinion 48 drivingly fixed to the opposite end of the flexible shaft.

The flexible shaft includes a non-rotatable sheath 49 and means, such as the clamps 50 shown in FIG. 1, fix the upper part of the sheath to the frame of the bicycle while the lower sheath end adjacent to the sprocket shaft 24 is connected by clamps 51, FIG. 3, to a separating plate 52 which itself is connected to the frame by clamps 53.

As best seen in FIG. 3 the rotatable shaft 30 is co-axially received in a two-part sleeve 54,56 each part being disposed between one of the ends of the rotatable shaft 30 and the first bevel gear 42, each part of the sleeve including bearing means 58, 60 for that portion of the rotatable shaft 30 received in the respective sleeve parts 54, 56. Complementary housing components 62, 64, see FIG. 3, are carried by the adjacent ends of the respective sleeve parts, as by the insertion of integral spigots 68 between the sleeve ends and bearings 60. The housing components cooperate with each other and with a fitting 69 on the end of the sheath to define a housing 70 enclosing the first bevel gear 42 and pinion 44. The housing 70 is so located with respect to the ends of the rotatable shaft that it is to one side of the stem 18 in order not to interfere with the connection 31 joining the sleeve part 54 with the stem 18. Clearly the rotatable shaft must be vertically spaced by its connection 31 on the steering fork 18 sufficiently far from the handlebars as to permit the rotation of the hand cranks 36, 38 without interference by the handlebars.

The hand cranks 36, 38 are shown having the same angularity with respect to the axis of the shaft 30. This permits a simultaneous push-pull action by both hands. However, if other manual action is desired, the set screws 74 seen in FIG. 3 permit individual angular adjustment of the hand cranks relative to the axis of the rotatable shaft.

In operation, the rider can drive the bicycle purely by foot action, steering the bicycle by the handlebars 20 in the usual manner. On the other hand the rider can drive and steer the bicycle by arm power exerted on the hand cranks, his feet can be off the pedals, can ride lightly on the pedals, can aid by exertion on the pedals or can oppose arm exertion in order to increase the exercising benefits of manual operation. The ends of the flexible cable are rigidly fixed relative to the bevel gears 42, 46 whereby it is impossible for the bevel pinions 44, 48 to separate from the respective gears 42, 46 no matter to what degree the steering fork is turned relative to the frame. There is sufficient slack in the flexible cable between the upper-most clamp 50 and housing 70 so that when the steering fork is turned to the right in FIG. 1, slack is taken up and when turned to the left slack is increased but any changes in slack commensurate with turning of the steering fork are well within the capacity of the flexible cable to drive the sprocket shaft.

The arrangement shown, described and claimed has been applied to a conventional bicycle and has been found to operate with great satisfaction, overcoming all the problems associated with other arrangements, as, for example, a universal joint drive.

Though a preferred embodiment of the invention has been shown and described, it will be apparent that the invention is susceptible to a variety of changes and modifications without, however departing from the scope and spirit of the appended claims.

What is claimed is:

1. For use with a riding bicycle of the type having a substantially rigid frame having a rear driving wheel, a front steering wheel and a sprocket carried by a foot pedal-operated shaft and drivingly connected to the rear wheel, the invention comprising a handlebar stem for connection to a steering for pivotally connected to said frame for rotatably supporting said front wheel, a handlebar carried by said stem, hand driving mechanism also carried by said stem comprising a rotatable shaft and a two part sleeve receiving said shaft, means connecting one of the parts of said sleeve to said stem in vertically spaced relation with respect handlebar and substantially parallel thereto, bearing means in each part of said sleeve rotatably supporting said shaft, a first bevel gear fixed to said shaft to one side of the axis of said stem, the opposite ends of said shaft terminating proximate the outer ends of said sleeve parts, a hand crank arm angularly adjustably connected to each of the ends of said shaft, a first bevel pinion engaging said first bevel gear, a second bevel gear for attachment to said foot pedal operated shaft, a second bevel pinion for attachment to said frame and drivingly engagable with said second bevel gear, a flexible shaft interconnecting said first and second bevel pinions, a flexible sheath surrounding said flexible shaft between said first and second pinions, and complementary housing components carried by the inner end of each part of said two part sleeve, said housing components cooperating with each other and with that end of said sheath adjacent said first pinion to define a housing to said one side of the axis of said stem enclosing said first bevel gear and said first pinion.

2. The invention of claim 1 including in combination therewith a conventional riding bicycle.

* * * * *